(12) United States Patent
Suzuki

(10) Patent No.: US 7,300,683 B2
(45) Date of Patent: Nov. 27, 2007

(54) METHOD OF FORMING RESISTANCE FILM

(75) Inventor: Yoshio Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 11/014,950

(22) Filed: Dec. 20, 2004

(65) Prior Publication Data

US 2005/0142710 A1    Jun. 30, 2005

(30) Foreign Application Priority Data

Dec. 26, 2003    (JP)   ............................ 2003-432499
Nov. 19, 2004    (JP)   ............................ 2004-335386

(51) Int. Cl.
     *B05D 5/12*      (2006.01)
     *B05D 3/00*      (2006.01)

(52) U.S. Cl. .................... 427/101; 427/189; 427/372.2

(58) Field of Classification Search ................ 427/101, 427/102, 180, 189, 197, 372.2
See application file for complete search history.

(56) References Cited

U.S. PATENT DOCUMENTS

| | | | |
|---|---|---|---|
| 3,672,931 A * | 6/1972 | Grosso et al. ................. | 427/68 |
| 5,409,544 A * | 4/1995 | Ota et al. .................. | 134/22.14 |
| 6,048,910 A | 4/2000 | Furuya et al. ................. | 522/86 |
| 6,485,345 B1 | 11/2002 | Fushimi ........................ | 445/24 |
| 6,600,263 B1 | 7/2003 | Ito ............................. | 313/495 |
| 6,847,161 B2 | 1/2005 | Ito ............................. | 313/495 |
| 2002/0195925 A1 | 12/2002 | Fushimi ...................... | 313/495 |
| 2003/0141803 A1 | 7/2003 | Fushimi ...................... | 313/495 |
| 2004/0041507 A1 | 3/2004 | Ito ............................. | 313/292 |

FOREIGN PATENT DOCUMENTS

| | | | |
|---|---|---|---|
| EP | 44878 | * | 7/1980 |
| JP | 03-74845 | | 3/1991 |
| JP | 05-265252 | | 10/1993 |
| JP | 06-116424 | | 4/1994 |
| JP | 09-22885 | | 1/1997 |
| JP | 10-279886 | | 10/1998 |
| JP | 11-080985 | | 3/1999 |
| JP | 2000-311605 | | 11/2000 |
| JP | 2000-311609 | | 11/2000 |
| JP | 2003-022710 | | 1/2003 |
| JP | 2003-098558 | | 4/2003 |
| JP | 2003-191605 | | 7/2003 |
| JP | 2003-223858 | | 8/2003 |
| JP | 2004-344854 | * | 12/2004 |

* cited by examiner

*Primary Examiner*—Brian K. Talbot
(74) *Attorney, Agent, or Firm*—Fitzpatrick, Cella, Harper & Scinto

(57) ABSTRACT

The invention provides a method of forming a resistance film with even thickness and at high speed even in a substrate having micro depressions and projections in its surface. A fine particle dispersion solution is prepared by adding a solution which decreases the absolute value of a $\xi$ potential at the fine particles and a solution which decreases dispersion stability of the fine particles into a solution in which metal oxide fine particles are stably dispersed, a substrate having an insulating surface is immersed in the fine particle dispersion solution to deposit a fine particle aggregation film, and then a resistance film is obtained by performing heat treatment.

1 Claim, 10 Drawing Sheets

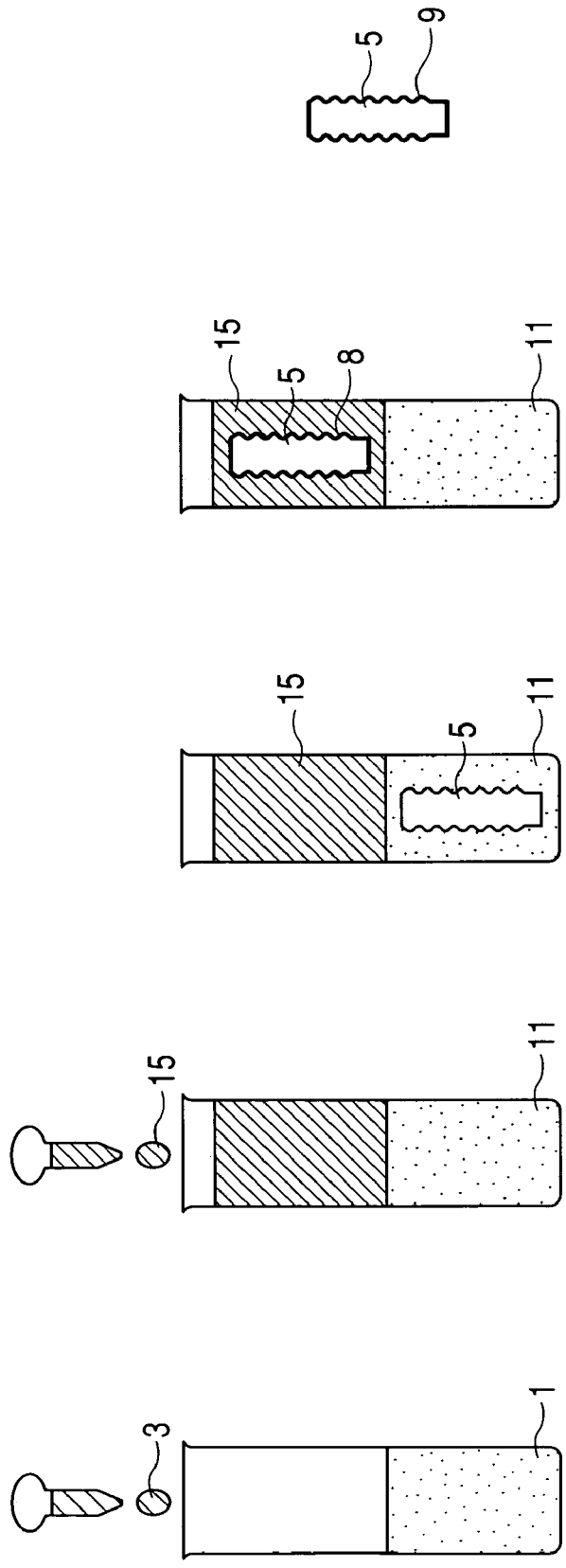

METHOD OF FORMING RESISTANCE FILM

BACKGROUND OF THE INVENTION

1. Field of the Invention

The present invention relates to a method of immersing a substrate in a fine particle dispersion solution, depositing a fine particle film on a surface of the substrate, and forming an antistatic film. Particularly the invention relates to the film depositing method suitable for forming the antistatic film on the substrate whose surface has micro depressions and projections, and an image display device and a television device which are formed thereby.

2. Related Background Art

In the method of depositing various kinds of functional films on the substrate, vacuum evaporation, sputtering, a CVD method, and the like are widely known as the method of depositing the film from a gas phase. Spray coating, a dipping and pulling-up method, spin coating, electrolytic plating, electroless plating, colloidal electrodeposition, a sol-gel method, liquid-phase deposition, and the like are well known as the method of depositing the film from a liquid phase. These film depositing methods are appropriately used depending on characteristics of each method.

In the vacuum evaporation and the sputtering which are of the method of depositing the film from the gas phase, although film characteristics can be precisely controlled, directional properties exist in depositing the film. Therefore, although the vacuum evaporation and the sputtering are suitable for the film deposition on the plane-shaped substrate, it is difficult to deposit the film on the whole surface of the substrate in which the surface is not smooth. Throughput is also low because a vacuum film depositing apparatus is required. When the film is upsized, there is a problem that the apparatus becomes very expensive.

In the atmospheric pressure CVD method, although a vacuum installation is not required, generally it is necessary to heat the substrate on which the film is deposited to a high temperature, and it is necessary that the substrate has high heat-resisting properties. Because a temperature distribution of the substrate is reflected to a characteristic distribution of the film, the even temperature distribution is required in depositing the film, and the temperature distribution is difficult to control particularly in the substrate having a complicated shape.

Generally the gas phase film depositing method is suitable for production of a thin film because a film material is supplied as gas. However, because material density is low, there is the common problem that film deposition speed is relative low. On the other hand, the liquid phase film depositing method has advantages that solute density can be largely increased and the film deposition speed is large, and the throughput is high, when compared with the gas phase film depositing method. Therefore, the liquid phase film depositing method is widely used in fields in which cost reduction is required.

In the electrolytic plating and the electroless plating, the film deposition speed is high, the film can be deposited over the substrate at once at a low temperature, and the film deposition can be performed at low cost. However, in the electrolytic plating and the electroless plating, the film material is limited to a metal material in which oxidation and reduction are easy to occur.

In the electrodeposition, because pigment fine particles in colloidal dispersion are attracted to the substrate Coulomb attraction in an electrophoresis phenomenon, it is necessary that the substrate itself is conductive.

In the dipping and pulling-up method, the spin coating, and the spray coating, the film can be deposited on the substrate having a large area with an extremely simple apparatus, and these methods are the low-cost film depositing means used in various fields. A sol-gel solution, a fine particle dispersion solution, and the like can be used as the film material, and a degree of freedom is large in selecting the substrate material and the film material. However, surface tension has a large influence on these film-depositing methods when a solution layer formed on the surface of the substrate is dried, so that it is difficult that the film is evenly deposited on the substrate having a micro, complicated shape. As shown in FIG. 9A, when the film is deposited on the surface of a substrate 5 having micro depressions and projections by these methods, as shown in FIG. 9B, the solution containing the film material is attracted to the depressions on the surface of the substrate by the surface tension, and it is inevitable that films 41 are thick in the depressions and films 42 are extremely thin in the projections. As shown in a partially enlarged view of FIG. 9C, ideally it is desirable that the film has the even thickness in both the depressions and the projections. However, currently the film shown in FIG. 9C is not realized.

In the liquid phase deposition (LPD), a technology in which an oxide thin film is mainly grown on the surface of the substrate by utilizing a solution chemical reaction between film raw materials solved in the solution is actively developed in recent years, and Japanese Patent Application Laid-Open No. H06-116424 discloses the technology. In the technology, the film can be deposited across the surface at a relatively low temperature irrespective of the shape of the substrate. The technology is promising in the future. However, currently a film deposition time is long and the available substrates and film materials are restricted.

On the other hand, a phenomenon in which the fine particles are absorbed to the surface of the substrate in the solution depending on conditions is well known, and the technology which prevents the absorption of foreign materials is widely researched particularly in the field of a washing technology (see Japanese Patent Application Laid-Open Nos. H03-74845 and H09-22885).

However, the absorption of the foreign material becomes only a state in which the surface of the substrate is sparsely contaminated by the extremely small amount of foreign material, and the absorption of the foreign material can not positively be utilized as means for forming the functional film on the substrate.

The technology, in which the thick and even fine particle film is deposited on the whole area of the insulating substrate surface having the micro depressions and projections at high speed by the simple technique as shown in FIG. 9C, is not developed in the conventional technology described above.

A plane type of display device which utilizes electric field electron-emission (FED) can be cited as an example of a member which needs the above-described technology.

In the plane type of display device (FED), it is necessary to provide a withstanding atmospheric pressure support body (spacer) because the inside is in a vacuum. In the spacer, it is necessary that an even antistatic film is formed on the whole insulating substrate so that the spacer withstands high voltage and electric charges are not accumulated on the surface by electron collision (see Japanese Patent Application Laid-Open No. 2000-311605 (U.S. Pat. No. 6,485,345) and No. 2000-311609 (U.S. Pat. No. 6,600,263). In addition, in order to restrain the emission of secondary elections on the spacer surface, it has recently been studied to manufacture the spacer by forming an antistatic film on a substrate having micro depressions and projections on its surface (see Japanese Patent Application Laid-Open No. 2003-223858 (US-2003-141803A)). Therefore, the above-described film depositing methods are studied for the means for forming the antistatic film.

A problem of the invention is to realize the even resistant film deposition on the insulating substrate surface having the micro depressions and projections at high speed and at low cost, which is difficult to realize by the conventional gas phase film deposition technology and liquid phase film deposition technology, particularly the dipping and pulling-up method, the spin coating, and the spray coating. Mainly the film depositing method of the invention enables the antistatic film to be formed on the withstanding atmospheric pressure support body (spacer) having the micro depressions and projections, which is used for the plane type of display device.

SUMMARY OF THE INVENTION

In a primary aspect, the present invention is directed to a method of forming a resistance film on a surface of a substrate having an insulating surface, the resistance film having a sheet resistivity less than of the insulating surface. This method of forming the resistance film comprises the steps of immersing the substrate in a solution in which fine particles made of a material of the resistance film are dispersed to wet a fine particle dispersion solution to the surface of the substrate, decreasing an absolute value of a $\xi$ potential at the fine particles in the fine particle dispersion solution wetted to the surface of the substrate so as to make it smaller than an absolute value of $\xi$ potential at the fine particles when these particles are being dispersed in the solution, to deposit a fine particle aggregation film on the surface of the substrate, and burning the fine particle aggregation film to form the resistance film.

Preferably, in the depositing step, the absolute value of the $\xi$ potential at the fine particles in the fine particle dispersion solution wetted to the surface of the substrate is set in the range of 0 to 40 mV.

It is preferable that the solution in which the fine particles made of the resistance film material are dispersed is a solution obtained by adding a diluting solution (B) having a polarity smaller than that of water and an adjusting solution (C) reducing the dispersion stability of the fine particles into an aqueous solution (A) in which the fine particles made of the resistance film material are dispersed.

It is preferable that the depositing step includes a step of adding an aggregation solution (E) having a polarity smaller than that of the water and the dielectric constant lower than that of the water into the solution wetted to the surface of the substrate, the fine particles being dispersed in the solution.

It is preferable that the depositing step includes a step of immersing the substrate immersed in the solution in which the fine particles are dispersed into an aggregation solution (E) having a polarity smaller than that of the water and a dielectric constant lower than that of the water.

It is more preferable that the polarity of the aggregation solution (E) is equal to or smaller than that of the diluting solution (B).

It is more preferable that a cycle of the wetting step and the depositing step is repeated plural times.

It is preferable that there is further comprised a step of immersing the substrate into a re-dispersion solution (F) after the depositing step, the re-dispersion solution having a polarity larger than that of the aggregation solution (E) and a dielectric constant higher than that of the aggregation solution.

In another aspect, the present invention is also an image display device comprising a rear surface plate which has electron-emission elements, a front surface plate which has an image display member, and an atmospheric pressure-resistant support body which is located between the rear surface plate and the front surface plate, wherein the atmospheric pressure resistant support body has a substrate and an resistance film with which the substrate is covered, and the resistance film is formed by any one of the above-described methods.

In further another aspect, the present invention is also a television device comprising the above-described image display device, a television signal receiving circuit, and an interface unit which connects the image display device and the television signal receiving circuit.

BRIEF DESCRIPTION OF THE DRAWINGS

FIGS. 6A, 6B, 6C, 6D and 6E are a view schematically showing the process of a third embodiment of the invention;

DETAILED DESCRIPTION OF THE PREFERRED EMBODIMENTS

Since the film depositing method of the invention is not affected by surface tension because the film is formed in a solution, and the antistatic film having the even thickness can be formed on the substrate surface having the micro depressions and projections. Since the film depositing method of the invention includes the simple method of immersing the substrate in the solution, the complicated and expensive apparatus is not required, and the film depositing method of the invention can respond easily to upsizing of the substrate and mass production. Further, in the film depositing method of the invention, the solution used in the process is high in a utilization ratio, and the antistatic film can efficiently be formed at high film deposition speed.

According to the invention, the antistatic film having the even thickness can be formed on the surface of the member having the micro depressions and projections, such as the surface of the withstanding atmospheric pressure support body, in the plane type of image display device, so that cost reduction can be achieved in the production while reliability of the device can be improved.

Generally, in the fine particles being dispersed in the solution, an electrical double layer is formed in the surface, and the electrical double layer has a positive or negative electrical charge. An outer hull which is moved with particles is referred to as slide plane in the electrical double layer formed on the surface. In a potential distribution, the slide plane is usually referred to as a ξ potential, and the ξ potential is one which can be measured from the outside. It is well known that the ξ potential is largely changed depending on a type of fine particle surface material, a species of solvent, electrolyte concentration, hydrogen ion concentration (pH), a surface active agent, and the like.

FIGS. 3A, 3B and 3C to FIGS. 5A, 5B and 5C are a view schematically showing a reaction of dispersion and aggregation of the fine particles.

Figure 3A:
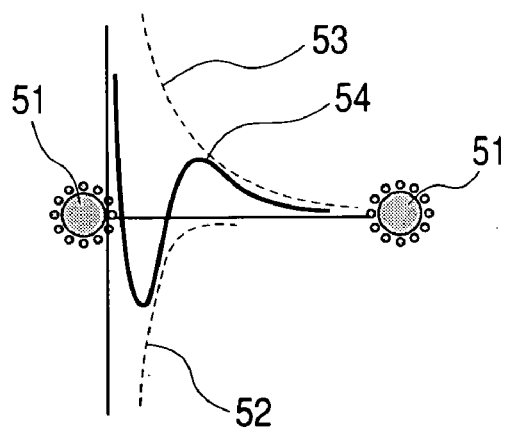
FIGS. 3A, 3B and 3C are an explanatory view showing a basic principle of the invention.

When the fine particles in the solution are held at the dispersion state as shown in FIG. 3A, the attraction 52 between molecules which attenuates in inverse proportion to the fifth to seventh powers of the distance between the fine particles and the Coulomb repulsion 53 which attenuates in inverse proportion to the first to second powers of the distance between the fine particles are exerted between the fine particles 51. In addition, the composite force 54 obtained by adding together the attraction 52 and the Coulomb repulsion 53 is denoted with a solid line. These different two forces are largely different in arrival distance (distance which a force reaches) from each other; therefore if there are surface charges larger than a certain degree, the Coulomb repulsion between the fine particles which becomes predominant prevent the fine particles from coming near to each other. This Coulomb repulsion, which is due to the charges on the fine particle surface, is generally measured as a ξ potential.

Figure 3B:
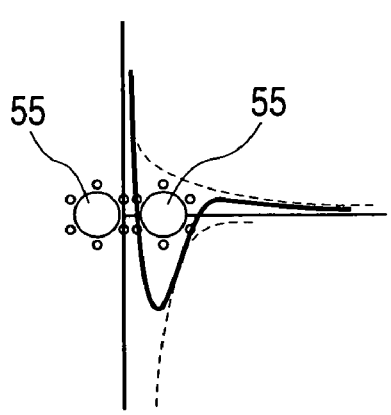

FIG. 3B shows a situation in which the fine particles are aggregated by the attraction between molecules because the Coulomb repulsion is weakened due to the decreased surface charges of the fine particles. Thus, the aggregation of the fine particles is explained by the decline of the Coulomb repulsion caused by the charges on the particle surface, and the surface charges do not necessarily become zero.

Figure 3C:
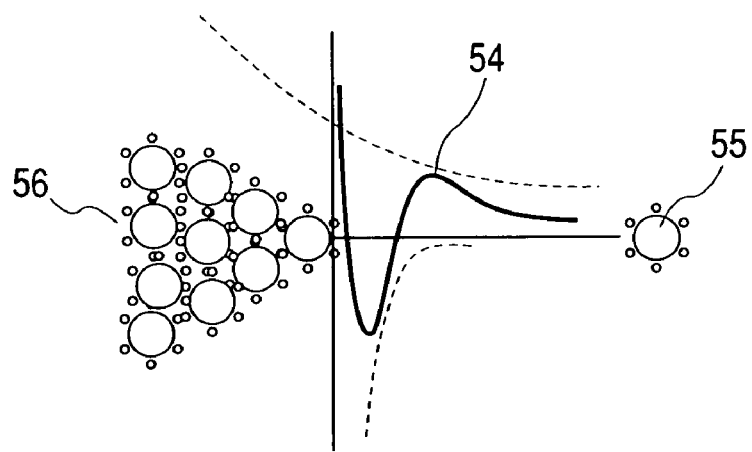

FIG. 3C shows a situation in which the aggregation of the fine particles progresses in the above-described manner and as a result the Coulomb repulsion is re-created. The re-created Coulomb repulsion results from that the attraction between molecules, (which reaches as far as a short distance) attenuates in inverse proportion to the fifth to seventh powers of the distance and the Coulomb force (which reaches as far as a long distance) attenuates in inverse proportion to the first to second powers of the distance.

That is, since the attraction between molecules reaches only the surfaces of the closest particles, even if the aggregation of the fine particles progresses to become a cluster of fine particles, the attraction between molecules are not added together. By contrast, since the Coulomb repulsion reaches as far as a long distance, the residual charges of the particles located in the back of the aggregation body are added together for action. Therefore, the aggregation of the fine particles progresses and as the size of the aggregation body increases, the potential barrier of the Coulomb repulsion is again formed, and have occurs the phenomenon that new fine particles are again prevented from coming near to each other.

Figure 4A:
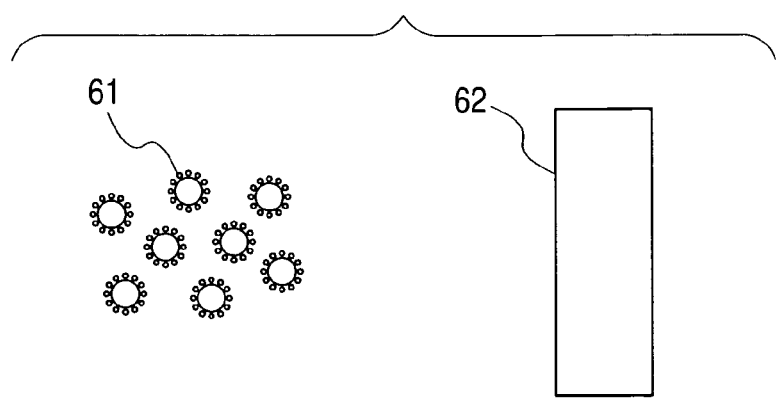
FIGS. 4A, 4B and 4C are an explanatory view showing the basic principle of the invention.
Figure 4B:
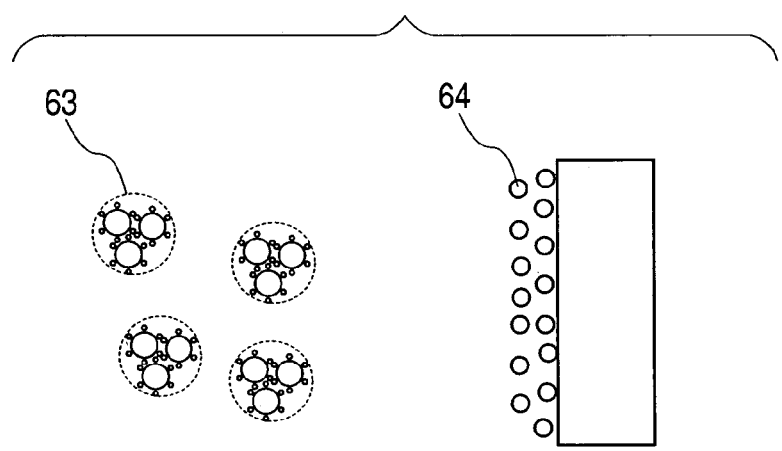
Figure 4C:
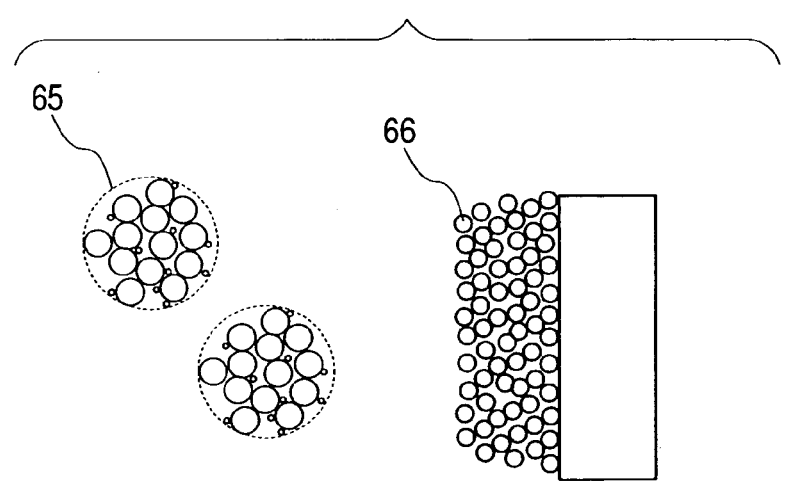

FIGS. 4A, 4B and 4C are view schematically showing the condition of dispersion and aggregation of the fine particles in the solution and on the substrate surface.

FIG. 4A shows the condition in which the dispersion of the fine particles is stably maintained, and the fine particles are not aggregated because both the surface of the particle 61 and the surface of the substrate hold sufficient surface charges.

FIG. 4B shows the condition of aggregation of the fine particles and the condition of forming the film onto the substrate in the case that the decrease of the absolute of the ξ potential is small, that is, the residual charges are large. Since the residual charges on the fine particle are comparatively large, the Coulomb repulsion again becomes predominant with a cluster of a few particles; therefore the size of the aggregation particle 63 is small and the thickness of aggregation film 64 formed on the substrate is also decreased.

FIG. 4C shows the condition of aggregation of the fine particles and the condition of forming the film onto the substrate in the case that the decrease of the absolute of the ξ potential is large. Because of the small residual charges on the particle surface, the Coulomb repulsion does not become predominant unless the particles are largely aggregated; therefore the size of the aggregation particle 65 is large and the thickness of the aggregation film 66 formed on the substrate is increased.

Figure 5A:
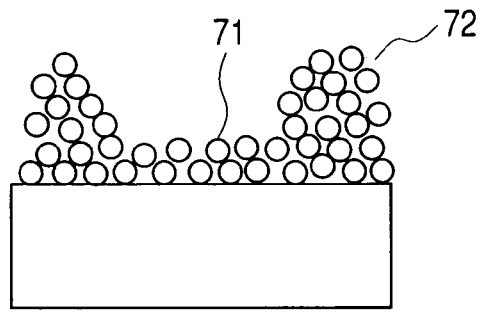
FIGS. 5A, 5B and 5C are an explanatory view showing the basic principle of the invention.
Figure 5B:
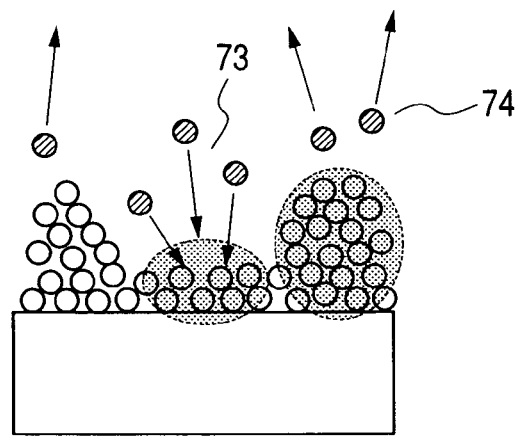
Figure 5C:
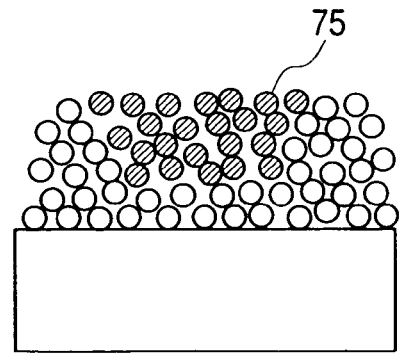

FIGS. 5A, 5B and 5C show that the aggregation film formed on the substrate surface has a constant thickness and a smooth surface property, which is the uniqueness of the present invention. Where, the term "smooth" means following a shape of the substrate surface. Specifically, if the substrate has a surface shape of depressions and projections, the "smooth" means that a film of depressions and projections is formed following the surface shape of the substrate.

FIGS. 5A, 5B and 5C are an explanatory view in the case that the depositing step is repeated plurality times.

As shown in FIG. 5A, when the aggregation film formed on the substrate surface by the initial aggregation reaction has an uneven film thickness, including a thin film part 71 and a thick film part 72, the repeat of the same aggregation reaction as shown in FIG. 5B causes new aggregation of the fine particles to be restrained at the thick film part 72 because the large Coulomb repulsion already occurs as a total sum of the cluster of particles at this part 72. While, at the thin film part 71, the aggregation reaction progresses at the thin film part 71 because the attraction between molecules becomes predominant because of the small Coulomb repulsion as the total sum is small.

Through such a process, the aggregation film 75, which is rendered smooth by the balancing action of the attraction and repulsion of the particles themselves, is formed, as shown in FIG. 5C. In short, one of unique features of the present invention resides in being able to control the thickness of the film by the control of the ξ potential of the fine particle.

The present invention is to mainly utilize the actions as stated above.

However, behavior of the dispersion and aggregation of the fine particles is a very complex phenomenon, and it is finally determined by an interaction between the electrical double layers formed near the surface of the solid in the solution. An abundance ratio of water, a molecular structure (polarity and dielectric constant) of the organic solvent, characteristics of a surface active agent and the like can be cited as an example which has an influence on the structure of the electrical double layer. It is known that aggregation speed and the thickness of the fine particle absorption layer are varied by the changes in the above-described factors.

These are the extremely complicated phenomenon, and currently it is difficult to theoretically completely explain the phenomenon.

Through trial and error of various additives, species of solvents, procedures, and immersion techniques, the invention enables the even fine particle film to be formed on the surface of the substrate at high speed by the simple method of immersing the substrate in the fine particle dispersion solution.

The film depositing method of the invention comprises the steps of immersing the substrate in a solution in which fine particles made of an antistatic film material are dispersed to wet a fine particle dispersion solution to the surface of the substrate, decreasing an absolute value of a $\xi$ potential at the fine particles in the fine particle dispersion solution wetted to the surface of the substrate to deposit a fine particle aggregation film on the surface of the substrate, and burning the fine particle aggregation film to form the antistatic film. The invention will specifically described referring to preferred embodiments of the film depositing method of the invention.

Each of the solutions as used in the present invention has the following characteristics.

The fine particle solution (A) is a solution in which particles are dispersed in water or a mixture of the water and an organic solvent. It is desirable that a diameter of this particle ranges from 4 nm to 20 nm, and it is experimentally recognized that the more the diameter increases, the less the deposition property decreases.

And, as the fine particle, not only a particle made of a simple substance but also a particle which is surface-modified with a silanol group or carbon group is used.

The adjusting solution (C) is selected for the purpose of adjusting the dispersion stability of the fine particles.

In the present invention, it is required that the adjusting solution (C) is made of a material which has an adjusting action of reducing the dispersion stability of the fine particles and causing the aggregation reaction that is sensitive to slight decrease of hydrated water around the fine particles. Some of the surface active agents have such an adjusting action, and while the present invention uses tetramethyl ammonium hydroxide or hydroxide chlorine (trimethyl-2-hydroxyethylammonium hydroxy oxide solution) as quaternary ammonium, other materials having the same adjusting action may be used.

The diluting solution (B) is a solution used to decrease the absolute value of the $\xi$ potential of the fine particle. The diluting solution (B) serves to decrease the absolute of the $\xi$ potential to the vicinity of the boundary at which the fine particles in the fine particle dispersion solutions are maintained beforehand in dispersion state so that the aggregation reaction is swiftly created in the vicinity of the surface of the substrate in the next processing step. This diluting solution (B) uses an organic solvent of single substance or mixture which has a polarity smaller than that of water. In the example, there can be mainly used alcohols.

The aggregation solution (E) is a solution used to cause the fine particles in the fine particle dispersion solution to lose the hydration stability to instantaneously create the aggregation of fine particles. The aggregation solution (E) has an action of robbing the hydrated water around the fine particles by soluble property to water and a characteristic that the aggregation of fine particles is created after being substituted for the water due to a small polarity. The organic solvent which has a polarity smaller than the water is used as this aggregation solution as well as the diluting solution (B). And, it is preferable that the aggregation solution (E) has a polarity smaller than that of the diluting solution (B). Concretely, as the aggregation solution (E), the alcohols of single substance or mixture can be used as well as the diluting solution (B).

The re-dispersion solution (F) is a solution which has a polarity larger than the aggregation solution (E), thereby causing the $\xi$ potential of the fine particle to again rise. A value of the polarity of the re-dispersion solution is selected in such a manner that only the fine particles at the thick part of the aggregation film of fine particles formed on the substrate surface by immersing in the re-dispersion solution (that is, a part at which the total sum of the Coulomb repulsion is large and hence a bonding force is comparatively small) is preferentially re-dispersed. If the polarity of this solution is too large (the $\xi$ potential of the fine particle is too high), most of the formed fine particle aggregation film is lost; therefore it is necessary to adjust the polarity of the solution by properly mixing two kinds or more solvents. For instance, it is easy to perform the adjustment by selecting the alcohols in accordance with the number of carbons and mix the selected ones.

Alcohol is preferably used as the water-soluble organic solvent used in the solutions (B), (E) and (F) in the first to fourth embodiments. Specifically, methyl alcohol, isopropyl alcohol (IPA), n-propanol, or the like is solely used or at least the two alcohols described above are used according to the characteristics required for each solution used in each embodiment. Ethers such as dioxane, amines such as monoethylamine, glycol ethers such as methyl Cellosolve, ketones such as acetone, carboxylic acids such as acetic acid, and esters such as Carbitol acetate can be used as the water-soluble organic solvent by appropriate selection in addition to alcohols.

First Embodiment

The processing steps of the first embodiment of the present invention are schematically shown in FIGS. 1A to 1D. In FIGS. 1A to 1D, 1 refers to the fine particles solution (A), 2 the diluting solution (B), 3 the adjusting solution (C), 4 the particle dispersion solution obtained by mixing the fine particle solution (A), diluting solution (B) and adjusting solutions (C), 13 the aggregation solution (E), and 5 the substrate.

Metal oxide is preferably used as the antistatic film material used in the invention. Particularly it is preferable that the antistatic film material mainly any one of contains tin oxide, zinc oxide, and titanium oxide. The fine particle contains 0.1 to 10 mass-percent metal oxide. It is also possible that 1 to 20 mass-percent antimony and the like are doped in the fine particle. A diameter of the fine particle preferably ranges from 4 to 20 nm.

The diluting solution (B) is a solution used to decrease the absolute value of the $\xi$ potential of the fine particles in the fine particle solution (A). Preferably, as the diluting solution (B), a solution which has a polarity smaller than that of the solvent of the particle solution (A) and which mainly contains a water soluble organic solvent having a low dielectric constant. And, for example, a water is used as a solvent of the fine particle solution (A).

The adjusting solution (C) is a solution for adjusting the dispersion stability of the fine particle, and there is used an aqueous solution such as quaternary ammonium or preferably, tetramethyl ammonium hydroxide.

In the embodiment, the diluting solution (B) 2 is first added to the fine particle solution (A) 1. At this point, the kind and the additive amount of the solution (B) 2 are adjusted so that only the addition of the solution (B) 2 does not generate the aggregation.

Figure 1A:
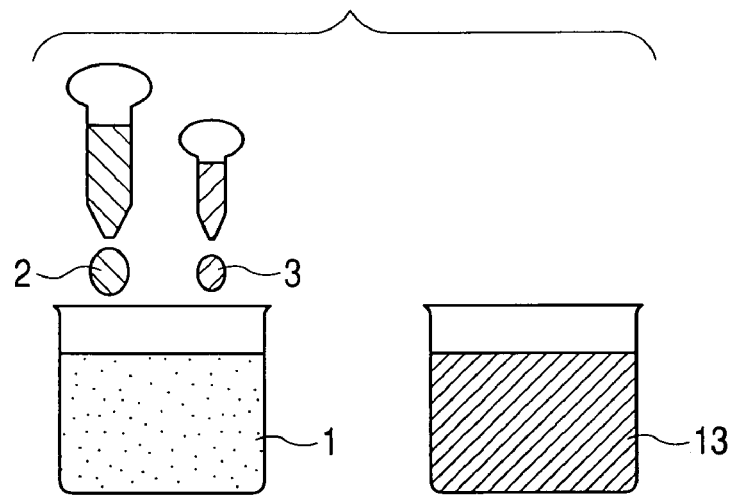
FIGS. 1A, 1B, 1C and 1D are a view schematically showing a process of a first embodiment of the invention.

Then, the fine particle dispersion solution 4 is adjusted by adding the solution (C) 3 into the above-described fine particle dispersion solution (see FIG. 1A).

Figure 1B:
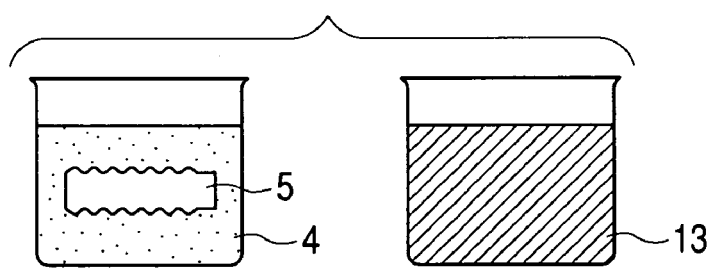

The substrate 5 is immersed into the fine particle dispersion solution (1) 4 and the solution is oscillated for several seconds to several minutes to cause the surface of the substance 5 to be sufficiently wetted with the fine particle dispersion solution 4 (see FIG. 1B). The substrate 5 used in the present invention has an insulating surface, and preferably contains Si in its surface.

This embodiment is a method of using the solution (E) to reduce the used amount of the particle solution (A) as little as possible, thereby increasing a utilization rate of an antistatic film material to a limit to attain a high film deposition speed.

The aggregation solution (E) used in the embodiment is one which reduces the absolute value of the ξ potential of the fine particles further than the diluting solution (B). The aggregation solution (E) is prepared so that the fine particle aggregation occurs instantly when the fine particle dispersion solution 4 is dropped in the aggregation solution (E). Specifically the solution which mainly contains the water-soluble organic solvent having the polarity equal to or smaller than that of the solution (B) and having the dielectric constant equal to or lower than that of the solution (B) is used, as the solution (E).

Figure 1C:
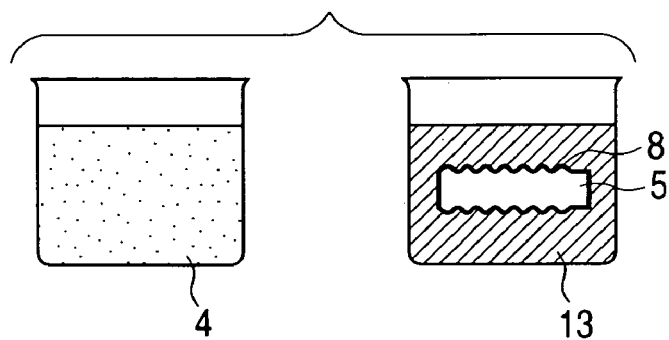

The substrate 5 is pulled up from the fine particle dispersion solution 4 and the substrate 5 is rapidly immersed in the solution (E) 13 without drying (see FIG. 1C). By the operation, the large amount of aggregation solution (E) 13 is substituted for the small amount of fine particle dispersion solution (1) 4 wetting the surface of the substrate 5 to instantly eliminate the dispersion stability of the fine particles. Therefore, almost all of the fine particles attracted to the surface of the substrate 5 are absorbed and aggregated to the surface of the substrate 5 to form the fine particle aggregation film 8 with extremely high efficiency. In the embodiment, since the diluting solution (B) 2 is added to the fine particle dispersion solution 4, the film thickness of the fine particle aggregation film 8 formed at one time is thicker.

Figure 1D:

In this embodiment, because the mixture of the solutions is limited to the extremely small amount of solution which is moved by adhering to the surface of the substrate 5, the functions of the fine particle dispersion solution 4 and the aggregation solution (E) 13 are maintained. Therefore, it is not necessary to newly prepare the fine particle dispersion solution (1) 4 and the aggregation solution (E) 13, and it is possible to repeatedly perform the immersion in an alternating manner using the same fine particle dispersion solution (1) 4 and the same solution (E) 13. The fine particle aggregation film 8 is deposited to the predetermined thickness by repeating the cycle of the alternating immersion, and then the antistatic film 9 is obtained (FIG. 1D).

In the embodiment, the extremely small amount of fine particle dispersion solution can efficiently be used for the formation of the fine particle aggregation film 8 on the substrate surface. Further, the alternating immersion of the substrate into the fine particle dispersion solution and the aggregation solution (E) preferentially generates the fine particle absorption in the next cycle in a part where the substrate surface is exposed while the fine particles do not adhere, so that the action of making the film thickness even can be obtained and the antistatic film having the even thickness can be formed in a short time.

Second Embodiment

A second embodiment is one in which the processes of the first embodiment is improved. The second embodiment is a technique of forming the extremely thin and even antistatic film.

FIGS. 2A, 2B, 2C, 2D and 2E schematically show the process of the second embodiment. In FIGS. 2A to 2E, the numeral 14 designates a re-dispersion solution (F), and the same member as FIGS. 1A to 1D is designated by the same reference numeral.

The re-dispersion solution (F) used in this embodiment is one which increases the dispersion stability of the fine particles. The solution which mainly contains the water-soluble organic solvent having the polarity larger than that of the aggregation solution (E) is used as the solution (F), or the composition of the water-soluble organic solvent is prepared so as to obtain the combination in which the solution (F) is larger than the aggregation solution (E) in the polarity, i.e. the solution (F) is higher than the solution (E) in the dielectric constant.

FIGS. 2A, 2B, 2C, 2D and 2E show an example in which the fine particle dispersion solution (1) and the solution (E). The example shown in FIGS. 2A, 2B, 2C, 2D and 2E, will specifically be described below.

Figure 2A:
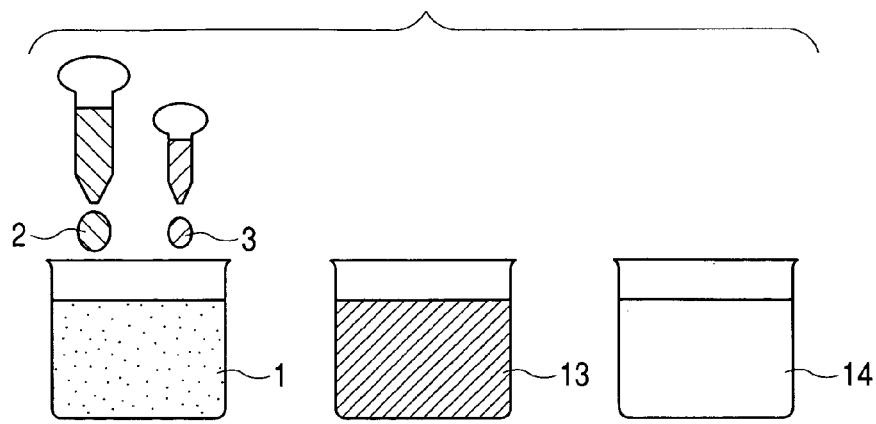
FIGS. 2A, 2B, 2C, 2D and 2E are a view schematically showing the process of a second embodiment of the invention.
Figure 2B:
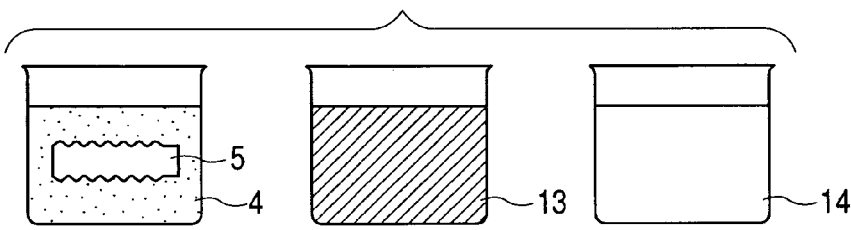
Figure 2C:
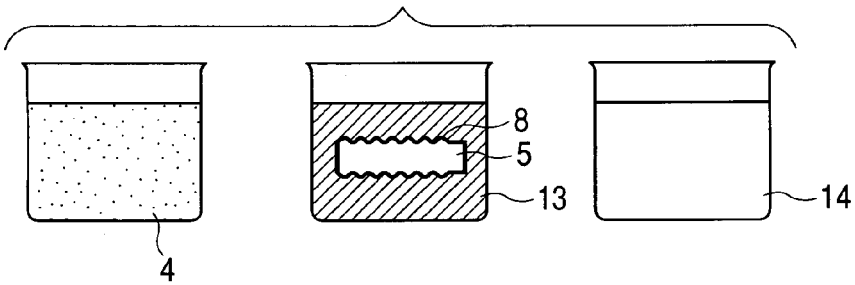
Figure 2D:
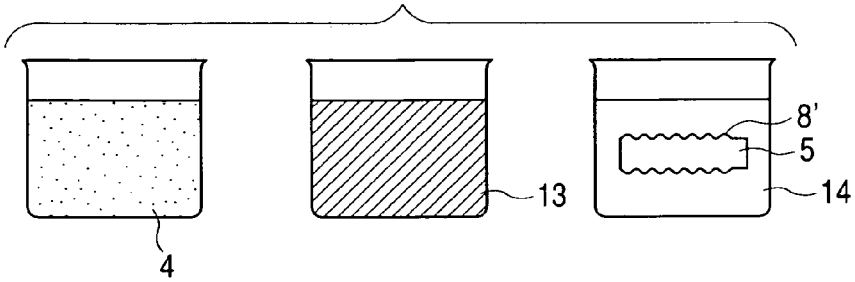
Figure 2E:

Similarly to the first embodiment, the fine particle dispersion solution 4 is prepared with the fine particle solution (A) 1, the diluting solution (B) 2, and the adjusting solution (C) 3 (see FIG. 2A). The substrate 5 is immersed in the fine particle dispersion solution (1) 4 (see FIG. 2B), and then the substrate 5 is rapidly immersed in the solution (E) 13 (see FIG. 2C). The substrate 5 on which the fine particle aggregation film 8 is deposited is pulled up and immersed in the solution (F) 14 without drying (FIG. 2D). At this point, a part of the fine particles in the fine particle aggregation film 8 which is absorbed and aggregated onto the surface of the substrate 5 is dispersed into the solution (F) 14 again to become a state in which a fine particle aggregation film 8' having the film thickness thinner than that of the fine particle aggregation film 8 is left. The re-dispersion force of the fine particles can be adjusted by preparing the type or the mixture composition of the immersion solution (F) 14.

In order to obtain the thin and even antistatic film 9, the solution (F) 14 is prepared so that the fine particles are absorbed onto the surface of the substrate 5 by a Van der Waals attraction between the surface of the substrate 5 and the fine particles and Coulomb repulsion between the fine charged particles having the same polarity causes the re-dispersion. Therefore, in the fine particles which are temporarily absorbed and aggregated onto the surface of the substrate 5, the re-dispersion occurs from the fine particles which is located far away from the surface of the substrate 5 and has the weak Van der Waals attraction, and a probability that the fine particles located near the surface of the substrate 5 continues to be absorbed to the surface of the substrate 5 is increased. Consequently, according to difference in distance between the fine particle and the surface of the substrate 5, the evenness of the thickness is achieved in the fine particle aggregation film 8.

The process of immersing the substrate 5 in the fine particle dispersion solution (F) 14 and the aggregation solution (E) 13 after immersing the substrate 5 in the solution (F) 14 is repeated until the fine particle aggregation film 8 having the predetermined thickness is obtained. Finally the antistatic film 9 is obtained by performing the heat treatment similar to the first embodiment after drying to fix the fine particle aggregation film 8 to the substrate 5.

Third Embodiment

FIGS. 6A, 6B, 6C, 6D, and 6E schematically show the process of a third embodiment. In FIGS. 6A, 6B, 6C, 6D, and 6E, the numeral 15 designates a solvent (a), and the same member as FIGS. 2A, 2B, 2C, 2D and 2E is designated by the same reference numeral.

Similarly to the first and second embodiments described above, the third embodiment is the technique of forming the fine particle aggregation film 8 without taking out the substrate 5 in a gas phase when the substrate 5 is alternately immersed in the different solutions.

The solvent (a) used in this embodiment is not compatible with the fine particle dispersion solution (2) and the fine particle dispersion solution (2) is the water solution as described above, so that the organic solvent which is not compatible with the water is used as the solvent (a). Specifically, alcohols which are not compatible with the water, e.g. butanol is preferably used.

In the third embodiment, similarly to the first embodiment, the fine particle dispersion solution 11 is prepared by mixing the adjusting solution (C) 3 into the fine particle solution (A) 1 (see FIG. 6A). At this point, the mixture ratio or the composition of the fine particle solution (A) and adjusting solution (C) are prepared so that the fine particle aggregation does not occur in the fine particle dispersion solution 11.

Then, the solvent (a) 15 is quietly poured into the fine particle dispersion solution 11 to prepare a treatment solution which is vertically separated into two solutions (FIG. 6B).

The substrate 5 is immersed in the phase of the fine particle dispersion solution 11 in the treatment solution and oscillated for several seconds to several minutes, and the surface of the substrate 5 is sufficiently wetted with the fine particle dispersion solution 11 (see FIG. 6C).

Then, the substrate 5 is pulled up to the phase of the solvent (a) (FIG. 6D). By the operation, the large amount of solvent (a) 15 is substituted for the small amount of fine particle dispersion solution 11 wetting the surface of the substrate 5 to instantly eliminate the dispersion stability of the fine particles. Therefore, the considerable amount of fine particle is aggregated to the surface of the substrate 5 to form the fine particle aggregation film 8 on the surface of the substrate 5.

In this embodiment, because the mixture of the solutions is limited to the extremely small amount of solution which is moved by adhering to the surface of the substrate 5, the functions of the fine particle dispersion solution 11 and the solvent (a) 15 are maintained. Therefore, it is not necessary to newly prepare the fine particle dispersion solution 11 and the solvent (a) 15, and it is possible to reciprocate the substrate 5 between the two liquid phases using the same fine particle dispersion solution 11 and the same solvent (a) 15. The fine particle aggregation film 8 is deposited to the predetermined thickness by repeating the reciprocating cycle, and then the antistatic film 9 is obtained by performing the heat treatment in the same way as the first embodiment (FIG. 6E).

According to this embodiment, it is possible to reciprocate the substrate 5 between the two liquid phases without taking out the substrate 5 in air. Therefore, the fine particle aggregation film can more efficiently be deposited on the substrate.

Fourth Embodiment

Figure 7A:
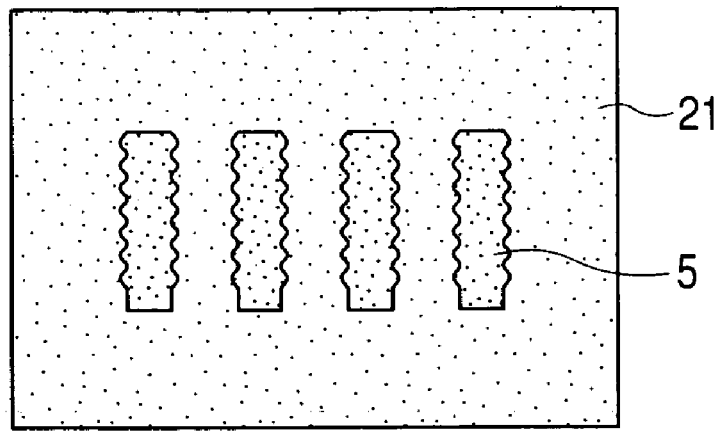
FIGS. 7A, 7B and 7C are a view schematically showing the process of a fourth embodiment of the invention.
Figure 7B:
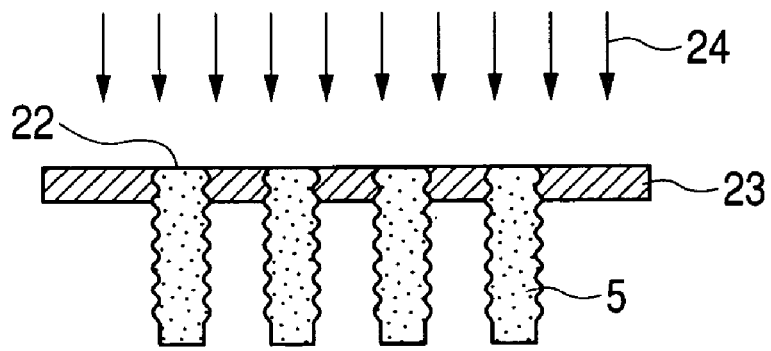
Figure 7C:
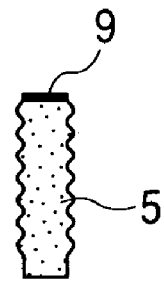

FIGS. 7A, 7B and 7C schematically show the process of a fourth embodiment. In FIGS. 7A, 7B and 7C, the numeral 21 designates a silane coupling agent, the numeral 22 designates an exposure portion, the numeral 23 designates a mask, the numeral 24 designates etching treatment, and the same member as FIGS. 1A to 1D is designated by the same reference numeral.

The inventor found that the fine particles are hardly deposited onto the surface of the substrate 5 when the surface of the substrate 5 is previously treated with the silane coupling agent. This embodiment is the technique in which the fine particle aggregation film is prevented from depositing on a part of the surface of the substrate 5 to selectively form the antistatic film on other parts by utilizing the characteristics to perform the treatment of hydrophobic group substitution to the part of the surface of the substrate 5.

First the outermost surface molecules of the substrate 5 are ended with the hydrophobic group such as a methyl group by placing substrate 5 in an atmosphere of the silane coupling agent 21 (see FIG. 7A). Even if the fine particles are deposited on the substrate 5 treated as shown in FIG. 7A by the process described in the first to third embodiments, the surface of the substrate 5 is in the state in which the fine particle aggregation film 8 can not be deposited.

Any silane coupling agent, in which terminal functional group which is not coupled to the substrate atom when the silane coupling agent is coupled to the substrate 5 becomes the hydrophobic group, can be used in the invention. For example, dimethyldiethoxysilane is preferably used.

In the substrate 5 whose whole surfaces are treated with the silane coupling agent, only the part (selection portion 22) where the fine particle aggregation film 8 is formed is exposed and other parts are shielded with the mask 23. In the state of things, only the hydrophobic groups on the surface of the substrate 5 are removed by performing the etching treatment 24 (see FIG. 7B). The dry etching techniques such as UV radiation, UV ozone etching, and atmospheric plasma treatment are desirably adopted as the etching treatment technique. However, it is possible to adopt the wet etching technique, and it is possible to adopt mechanical polishing.

When the process of depositing the fine particle aggregation film like the first to third embodiments is performed to the substrate 5 to which the etching treatment has been performed, the fine particle aggregation film is formed only in the selection portion 22 to which the etching treatment is performed and the fine particle aggregation film is not formed in other areas, so that the antistatic film 9 can selectively be formed (see FIG. 7C).

Alcohol is preferably used as the water-soluble organic solvent used in the solutions (B), (E) and (F) in the first to fourth embodiments. Specifically, methyl alcohol, isopropyl alcohol (IPA), n-propanol, or the like is solely used or at least the two alcohols described above are used according to the characteristics required for each solution used in each embodiment. Ethers such as dioxane, amines such as monoethylamine, glycol ethers such as methyl Cellosolve, ketones such as acetone, carboxylic acids such as acetic acid, and esters such as Carbitol acetate can be used as the water-soluble organic solvent by appropriate selection in addition to alcohols.

Fifth Embodiment

Figure 8:
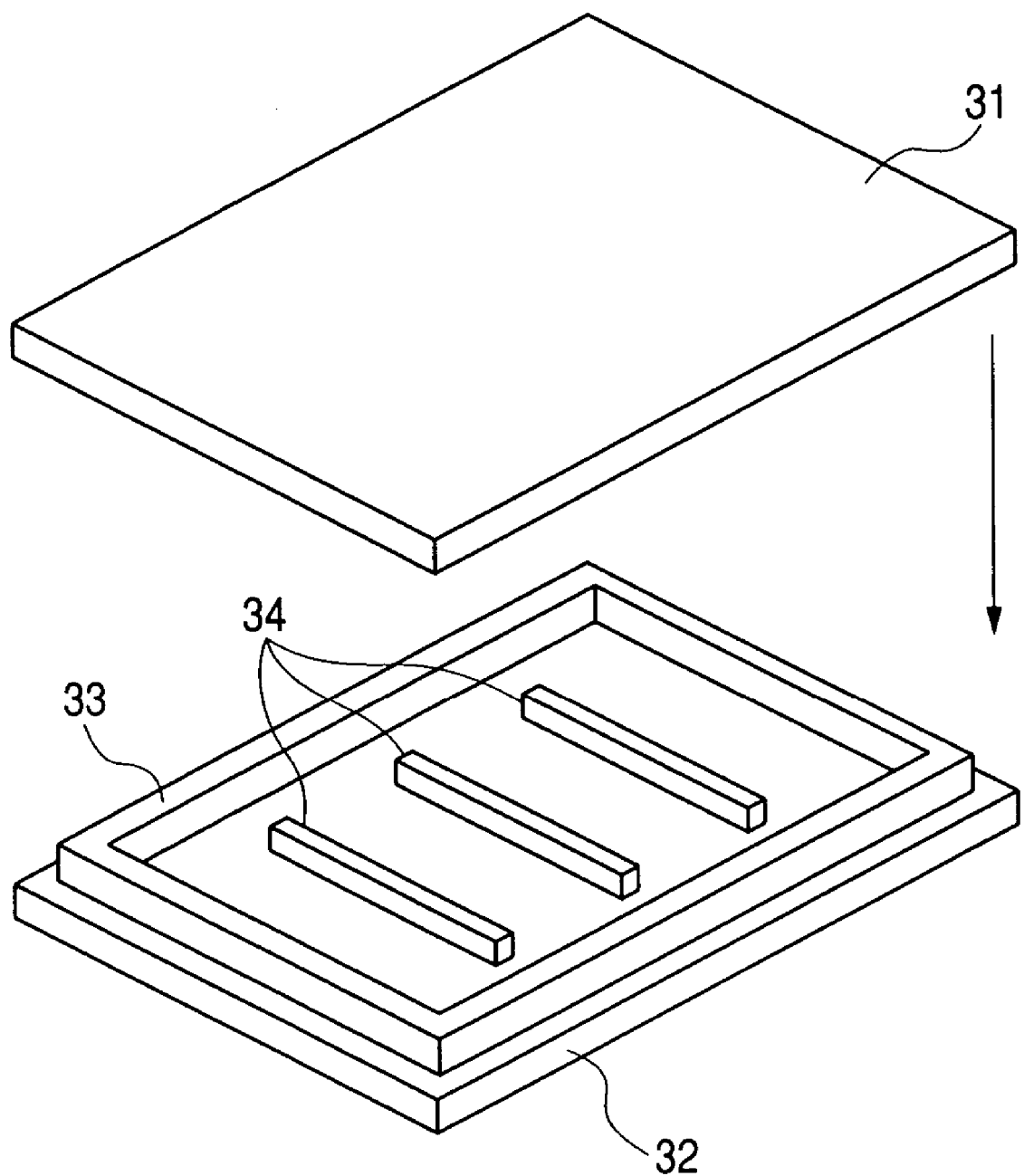
FIG. 8 is a view schematically showing a structure of a plane type of image display device for which a support body, to which the invention is applied, is use.
Figure 9A:
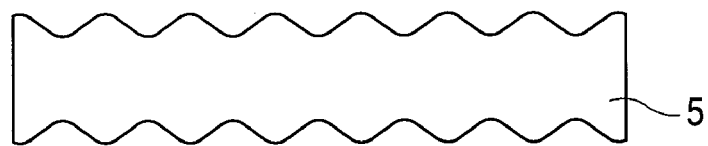
FIGS. 9A, 9B and 9C are a schematic view showing a state in which an antistatic film according to the invention is formed on a substrate surface having micro depressions and projections.
Figure 9B:
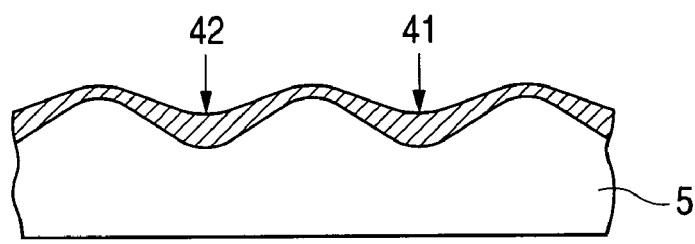
Figure 9C:
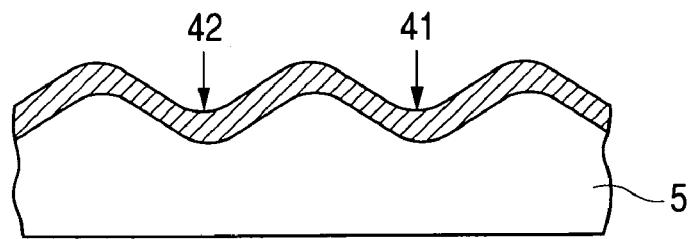

The film depositing method of the invention is preferably applied to the formation of the antistatic film on the surface of a withstanding atmospheric pressure support body (spacer) in the plane type of image display device. FIG. 8 schematically shows a configuration of the image display device. In FIG. 8, the numeral 31 designates a front surface plate, the numeral 32 designates a rear surface plate, the numeral 33 designates an outer peripheral frame, and the numeral 34 designates a support body.

The front surface plate 31 is a glass plate in which a metal back or the like is arranged, and high voltage ranging from 1 to 10 kV is applied to the front surface plate 31. The rear surface plate 32 is a glass substrate in which a multiplicity of surface conductive type of electron-emission elements is arranged. The front surface plate 31 and the rear surface plate 32 are bonded through the outer peripheral frame 33, and the inside is held in vacuum. Therefore, the withstanding atmospheric pressure support body 34 is required in order to support the atmospheric pressure applied to the front surface plate 31 and the rear surface plate 32. In order to withstand the high voltage and not to accumulate electric charges on the surface by electron collision, the glass substrate in which the micro depressions and projections are formed on the surface is used as the support body 34 and the antistatic film is formed over the surface.

In the method of depositing the antistatic film of the invention, even if a depth ranges from about 5 μm to about 20 μm and a width ranges from about 20 μm to about 40 μm in the micro depression portion or the projection portion, the antistatic film can be formed with even film thickness. The image display device to which the film depositing method of the invention is applied is similar to Japanese Patent Laid-Open No. 2003-223858 (US-2003-0141803A), so that the description will be neglected.

EXAMPLE 1

The antistatic film was formed by the process of the first embodiment while conditions were varied. Table 1 shows the result. In Table 1, IPS represents isopropyl alcohol, TMAH represents tetramethyl ammonium hydroxide water solution, ATO represents antimony-doped (10 mass-percent) tin oxide fine particles, and PD200 represents high strain point glass. The numeric value of substrate shape in Table 1 represents an interval between depressions.

In this embodiment, it was not perceived that the film is not formed on the substrate surface on the condition 1-1 in which 100 mass % alcohol was used as the aggregation solution (E). On the other conditions 1-2 to 1-4, it was found that the thickness of the antistatic film can be controlled according to the number of carbons in alcohol of the aggregation solution (E). Particularly, when n-propyl alcohol was used as the solution (E) as shown in the condition 1-4, it was found that the antistatic film having the thickness of 1 mm can be formed in a time as short as seven minutes and 30 minutes at five cycles.

TABLE 1

|  | 1-1 | 1-2 | 1-3 | 1-4 |
|---|---|---|---|---|
| Solution (A) Fine particle material | 190 ml ATO 1 Water 99 Mass part % | 190 ml ATO 1 Water 99 Mass part % | 190 ml ATO 1 Water 99 Mass part % | 190 ml ATO 1 Water 99 Mass part % |
| Solution (B) | 230 ml Ethanol 100 Mass % | 230 ml Ethanol 100 Mass % | 230 ml Ethanol 100 Mass % | 230 ml Ethanol 100 Mass % |
| Solution (C) | 6 ml TMAH 2 Water 98 Mass % | 6 ml TMAH 2 Water 98 Mass % | 6 ml TMAH 2 Water 98 Mass % | 6 ml TMAH 2 Water 98 Mass % |
| Solution (E) | Methyl alcohol 100 Mass % | Ethanol 100 Mass % | IPA 100 Mass % | n-propanol 100 Mass % |
| Fine particle dispersion solution (1) Immersion time | 60 seconds | 60 seconds | 60 seconds | 60 seconds |
| Solution (E) Immersion time | 30 seconds | 30 seconds | 30 seconds | 30 seconds |
| The number of repetitions | Five times | Five times | Five times | Five times |
| Solution heating | Nothing | Nothing | Nothing | Nothing |
| Substrate Material | PD200 | PD200 | PD200 | PD200 |
| Shape | Forming with 30-mm depressions and projections | Forming with 30-mm depressions and projections | Forming with 30-mm depressions and projections | Forming with 30-mm depressions and projections |
| Heat treatment temperature | 400° C. | 400° C. | 400° C. | 400° C. |
| Status of deposited film | Film is not deposited x | Even film ⊚ | Even film ⊚ | Even film ⊚ |
| Maximum film thickness | — | 60 nm | 640 nm | 1.2 μm |
| Average film thickness | — | 50 nm | 600 nm | 1.0 μm |
| Sheet resistance | — | $5 \times 10^9$ Ω/□ | $7 \times 10^7$ Ω/□ | $1 \times 10^6$ Ω/□ |

The antistatic film was formed by the process of the second embodiment while conditions were varied. Table 2 shows the result. In the second example, when ethanol in which the number of carbons is small and the polarity is large is used as the main component of the solution (F), the fine particle aggregation film formed once is substantially removed, and the fine particle aggregation film can remain in the form of the continuous film. Therefore, the even and thin antistatic film could be obtained by adjusting the types and the composition ratio of the solutions as shown in conditions 1-2 to 1-4.

TABLE 2

|  | 2-1 | 2-2 | 2-3 | 2-4 |
|---|---|---|---|---|
| Solution (A) | 190 ml | 190 ml | 190 ml | 190 ml |
| Fine particle material | ATO 1 Water 99 Mass part % | ATO 1 Water 99 Mass part % | ATO 1 Water 99 Mass part % | ATO 1 Water 99 Mass part % |
| Solution (B) | 230 ml Ethanol 100 Mass % | 230 ml Ethanol 100 Mass % | 230 ml Ethanol 100 Mass % | 230 ml Ethanol 100 Mass % |
| Solution (C) | 6 ml TMAH 2 Water 98 Mass % | 6 ml TMAH 2 Water 98 Mass % | 6 ml TMAH 2 Water 98 Mass % | 6 ml TMAH 2 Water 98 Mass % |
| Solution (E) | Ethanol 70 IPA 30 Mass % | Ethanol 70 IPA 30 Mass % | Ethanol 70 IPA 30 Mass % | Ethanol 70 IPA 30 Mass % |
| Solution (F) | Methyl alcohol 100 Mass % | Methyl alcohol 70 Ethanol 30 Mass % | Methyl alcohol 20 Ethanol 80 Mass % | Ethanol 100 Mass % |
| Fine particle dispersion solution (1) Immersion time | 60 seconds | 60 seconds | 60 seconds | 60 seconds |
| Solution (E) Immersion time | 30 seconds | 30 seconds | 30 seconds | 30 seconds |
| Solution (F) Immersion time | 30 seconds | 30 seconds | 30 seconds | 30 seconds |
| The number of repetitions | Three times | Three times | Three times | Three times |
| Solution heating | Nothing | Nothing | Nothing | Nothing |
| Substrate Material Shape | Quartz glass Forming 50-μm groove | Quartz glass Forming 50 μm groove | Quartz glass Forming 50 μm groove | Quartz glass Forming 50 μm groove |
| Heat treatment temperature | 430° C. | 430° C. | 430° C. | 430° C. |
| Status of deposited film | Film is not deposited x | Stripped pattern film Δ | Even film ○ | Even film ○ |
| Maximum film thickness | — | 20 nm | 50 nm | 65 μm |
| Average film thickness | — | 10 nm | 40 nm | 50 μm |
| Sheet resistance | — | $2 \times 10^{12}$ Ω/□ | $3 \times 10^{10}$ Ω/□ | $5 \times 10^{9}$ Ω/□ |

The atmospheric pressure-resistant support body of the plane type of image display device is formed by the high strain point glass (PD200). The antistatic film was formed by performing the alternating immersion at three cycles on the condition 2-3 of the second example to the substrate having a length of 600 mm, a height of 2 mm, and the thickness of 1.8 mm, in which the depressions and projections having the depth of 10 μm at periods of 35 μm were formed on the surface. As a result, the antistatic film having the sheet resistance of about $1 \times 10^{10}$ Ω/cm$^2$ and the thickness of 200 mm could evenly be formed on the whole surface having the depressions and projections.

The image display device of the invention can be applied to the television set. The television set to which the image display device of the invention is applied will be described below.

Figure 10:
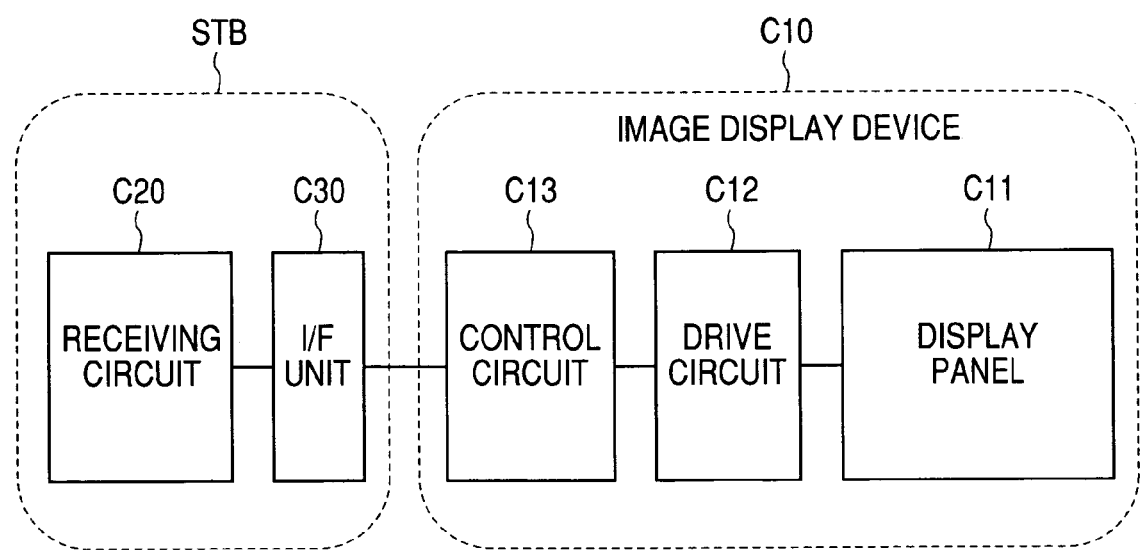
FIG. 10 is a block diagram of a television device of the invention.

FIG. 10 is a block diagram of a television device according to the invention. A receiving circuit C20 which includes a tuner and a decoder receives television signals of a satellite broadcast, a ground wave, and the like or data broadcast through a network, and the receiving circuit C20 outputs the decoded image data to an interface unit C30. The interface unit C30 converts the image data into a display format of an image display device C10 to output image data to the image display device C10. The image display device C10 includes a display panel C11, a drive circuit C12, and a control circuit C13. The image display device shown in FIG. 8 can be applied to the image display device C10. The control circuit C13 outputs the image data and various control signals to the drive circuit C12 while performing image processing such as correction processings suitable the display panel C11 to the input image data. The correction processings include a processing for retraining the variation in brightness between picture elements in the vicinity of an atmospheric pressure-resistant support body (spacer) and picture elements far from the atmospheric pressure-resistant support body (spacer), and it is preferable that the control circuit includes C13 has a circuit for correcting brightness. The drive circuit C12 operates to output a driving signal to the display panel C11 on the basis of inputted image data to display a television picture.

It is possible that the receiving circuit and the interface unit are accommodated in an enclosure different from the image display device in the form of a set-top box (STB), or it is possible that the receiving circuit and the interface unit are accommodated in the same enclosure.

Since the film depositing method of the invention is not affected by surface tension, and the antistatic film having the even thickness can be formed on the substrate surface having the micro depressions and projections. Since the film depositing method of the invention includes the simple method of immersing the substrate in the solution, the complicated and expensive apparatus is not required, and the film depositing method of the invention can respond easily to upsizing of the substrate and mass production. Further, in the film deposition method of the invention, the solution used in the process is high in the utilization ratio, and the antistatic film can efficiently be formed at high film deposition speed.

According to the invention, the antistatic film having the even thickness can be formed on the surface of the member having the micro depressions and projections, such as the surface of the withstanding atmospheric pressure support body, in the plane type of image display device, so that cost reduction can be achieved in the production while reliability of the device can be improved.

This application claims priority from Japanese Patent Applications No. 2003-432499 filed Dec. 26, 2003 and No. 2004-335386 filed Nov. 19, 2004, which are hereby incorporated by reference herein.

What is claimed is:

1. A method of forming a resistance film on a surface of a substrate having an insulating surface, the resistance film having a sheet resistivity less than that of the insulating surface comprising:

(a) providing a fine particle dispersion solution obtained by mixing in a container an aqueous solution in which fine particles made of a resistance film material are dispersed and an adjusting solution reducing the dispersion stability of the fine particles;

(b) preparing a treatment solution in which two liquid phases are vertically separated by pouring an organic solvent which is not compatible as a whole with the fine particle dispersion solution and forms a separate boundary into the container storing the fine particle dispersion solution;

(c) immersing the substrate into the treatment solution to wet the fine particle dispersion solution to the surface of the substrate;

(d) reciprocating the substrate between the fine particle dispersion solution phase and the organic solvent phase to decrease an absolute value of a xi ($\xi$) potential at the fine particles in the fine particle dispersion solution wetted to the surface of the substrate to a value smaller than an absolute value of xi ($\xi$) potential at the fine particles when the particles are being dispersed in the fine particle dispersion solution to deposit a fine particle aggregation film on the surface of the substrate; and (e) burning the fine particle aggregation film to form the resistance film.

* * * * *

UNITED STATES PATENT AND TRADEMARK OFFICE
CERTIFICATE OF CORRECTION

| | |
|---|---|
| PATENT NO. | : 7,300,683 B2 |
| APPLICATION NO. | : 11/014950 |
| DATED | : November 27, 2007 |
| INVENTOR(S) | : Yoshio Suzuki |

It is certified that error appears in the above-identified patent and that said Letters Patent is hereby corrected as shown below:

ON THE TITLE PAGE (75):

Inventor, "Yoshio Suzuki, Kangawa (JP)" should read --Yoshio Suzuki, Isehara (JP)--.

ON THE TITLE PAGE (56):

References Cited, "44878" should read --0 044 878--.

COLUMN 14:

Table 1, lines 56-57 "30-mm" should read --30-μm-- (all occurrences).

Signed and Sealed this

Seventh Day of October, 2008

JON W. DUDAS
*Director of the United States Patent and Trademark Office*